United States Patent
Lo

(10) Patent No.: US 9,448,586 B2
(45) Date of Patent: Sep. 20, 2016

(54) HOUSING FOR ELECTRONIC DEVICES COMPATIBLE WITH INSERTABLE MEMORY CARD

(71) Applicant: HON HAI PRECISION INDUSTRY CO., LTD., New Taipei (TW)

(72) Inventor: Wu-Jen Lo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 45 days.

(21) Appl. No.: 14/525,956

(22) Filed: Oct. 28, 2014

(65) Prior Publication Data
US 2015/0362952 A1    Dec. 17, 2015

(30) Foreign Application Priority Data
Jun. 13, 2014  (TW) .............................. 103120471 A

(51) Int. Cl.
*H05K 5/00*   (2006.01)
*G06F 1/16*   (2006.01)

(52) U.S. Cl.
CPC .................................. *G06F 1/1613* (2013.01)

(58) Field of Classification Search
CPC ............. G06K 13/08; G06K 13/0831; G06K 13/085; G06K 13/0875; G06K 7/0069; H05K 5/0295
See application file for complete search history.

(56) References Cited

U.S. PATENT DOCUMENTS 6,896,530 B2 * 5/2005 Nishio ................... H01R 23/70
                                                  439/137
7,493,430 B2 * 2/2009 Pione ....................... G06F 3/061
                                                   710/38

FOREIGN PATENT DOCUMENTS

CN          2857254 Y     1/2007
CN        201018036 Y     2/2008

* cited by examiner

*Primary Examiner* — Robert J Hoffberg
*Assistant Examiner* — Hung Dang
(74) *Attorney, Agent, or Firm* — Zhigang Ma

(57) ABSTRACT

An electronic device includes a housing, a pair of doors, and a memory. The doors are elastically and rotatably connected to the housing to shield the opening. Each door defines a guiding groove. When the memory card is inserted into the housing from the opening, the doors are rotated to open the opening, and the memory card is received in the guiding groove. When the memory card is removed from the housing, the doors shield the opening again so as to prevent contaminants from entering into the housing.

18 Claims, 8 Drawing Sheets

HOUSING FOR ELECTRONIC DEVICES COMPATIBLE WITH INSERTABLE MEMORY CARD

FIELD

The subject matter herein generally relates to housings, more particularly to a housing for an electronic device compatible with an insertable memory card.

BACKGROUND

Electronic devices such as personal computers, mobile telephones, personal digital assistants (PDAs), digital cameras, music players, game machines, and vehicle navigation devices, include a housing with a loading mechanism to loading various types of memory cards, such as subscriber identity module (SIM) cards, secure digital (SD) cards, mini SD cards into the electronic device.

BRIEF DESCRIPTION OF THE DRAWINGS

Implementations of the present technology will now be described, by way of example only, with reference to the attached figures.

DETAILED DESCRIPTION

Figure 1:
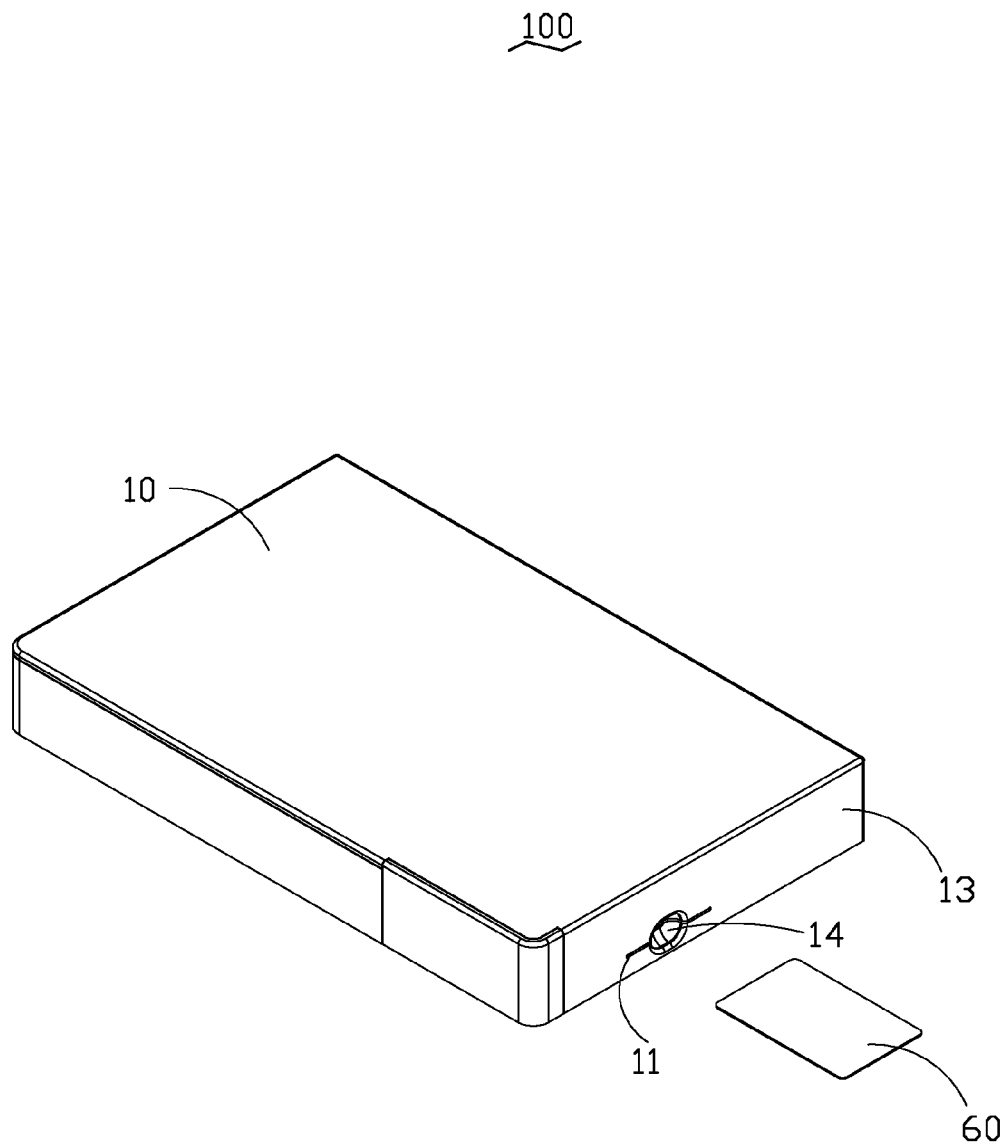
FIG. 1 is an isometric view of an electronic device with a first door, a second door, and a memory card.

It will be appreciated that for simplicity and clarity of illustration, where appropriate, reference numerals have been repeated among the different figures to indicate corresponding or analogous members. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an electronic device 100.

Figure 2:
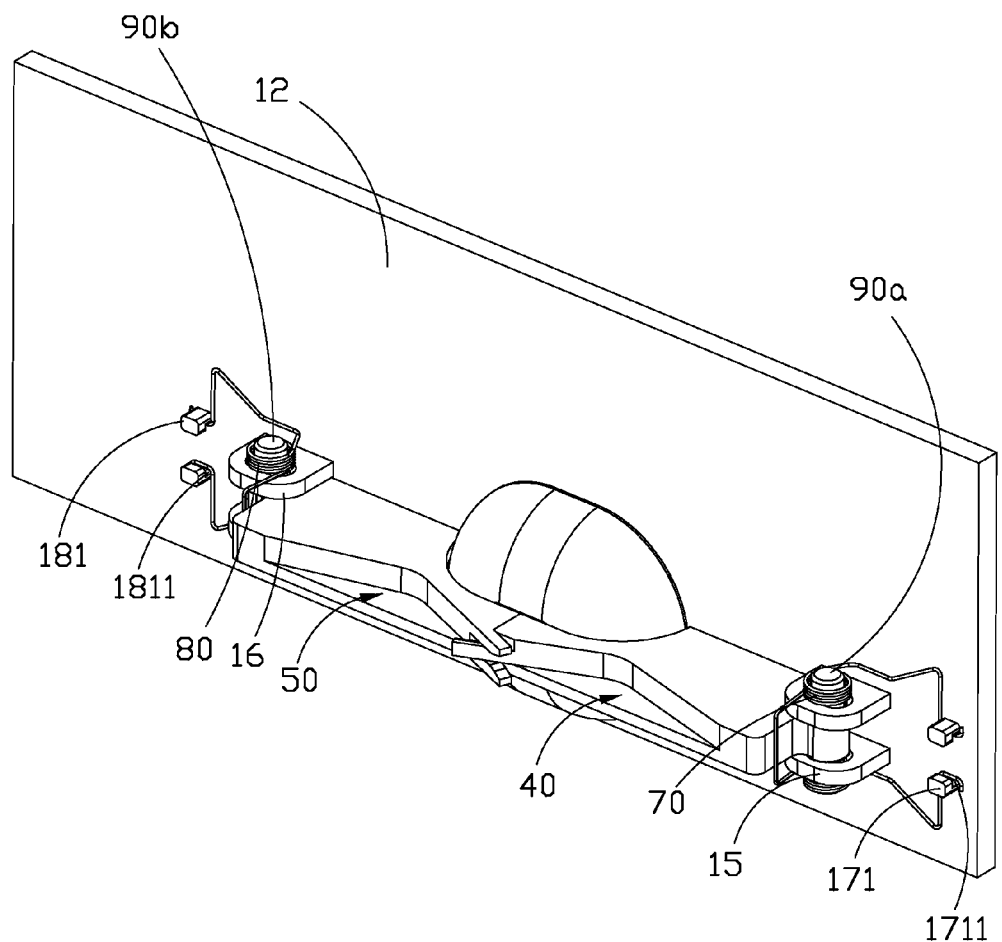
FIG. 2 is an isometric view of the first door and the second door of FIG. 1.
Figure 5:
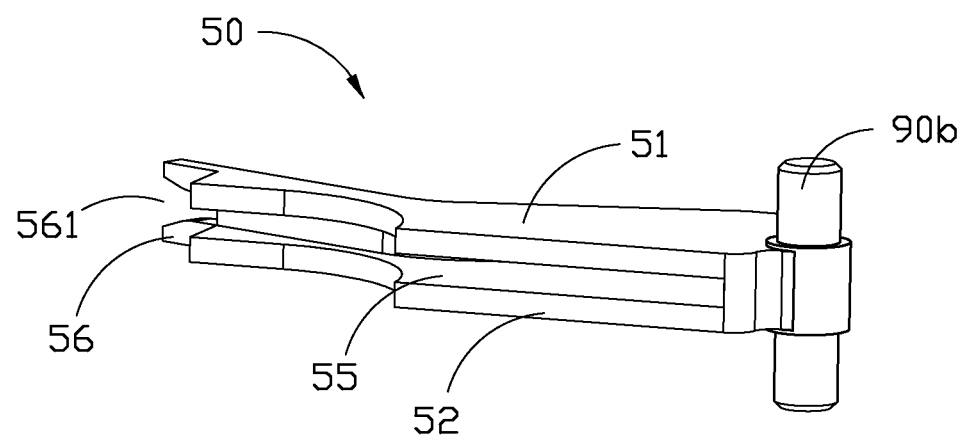
FIG. 5 is an isometric view of the second door of FIG. 2.

FIGS. 1 and 2 illustrate an electronic device 100 configured for receiving and communicating with a memory card 60. The memory card 60 can contain a memory and an integrated circuit. The memory card 60 can be a subscriber identity module (SIM) card, a secure digital (SD) card, and an encryption or security card. The electronic device 100 includes a housing 10, a first door 40, a second door 50, and a signal connector 30 (FIG. 5). An opening 11 is defined in the housing 10 and is configured for the memory card 60 to be inserted. The first door 40 and the second door 50 are elastically and rotatably coupled to the housing 10, and shield the opening 11. In the embodiment, the electronic device 100 may be a set-top box, a personal computer, a mobile telephone, a game machine, and so on. In the embodiment, the doors 40, 50 are located in two opposite sides of the opening 11.

The housing 10 includes an outer surface 13 and an inner surface 12 opposite to the outer surface 13. A through hole portion 14 is located on the outer surface 13. The opening 11 is defined in the through hole portion 14 running through the outer surface 13 and the inner surface 12. When the memory card 60 is inserted into the housing 10, a part of the memory card 60 is located in the through hole portion 14 and exposed to an outside of the housing 10, the memory card 60 can be removed from the housing 10 easily. In the embodiment, the opening 11 is in a rectangle-shaped.

Figure 3:
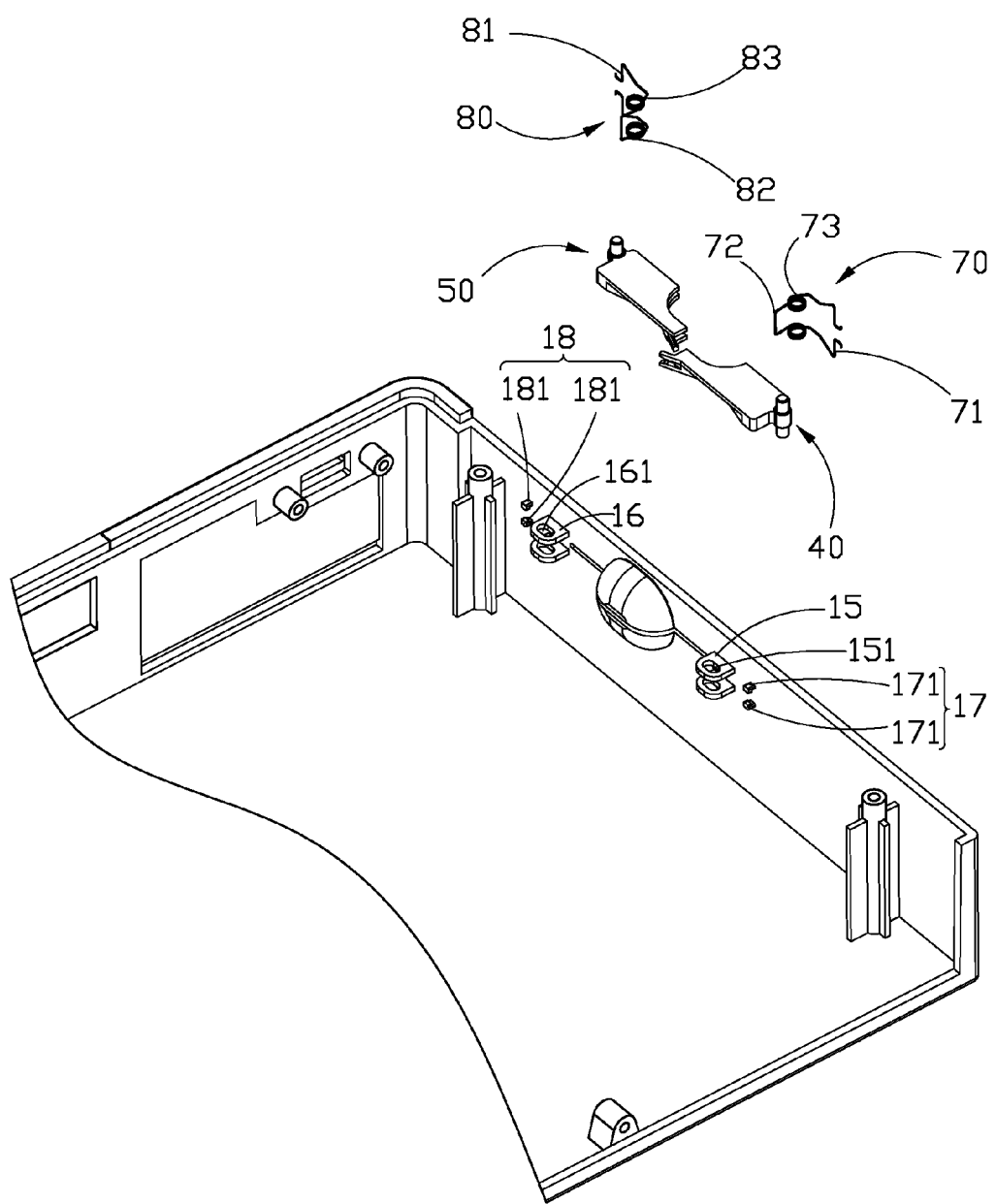
FIG. 3 is an exploded view of the first door and second door of FIG. 2.

FIG. 3 illustrates that a first bracket 15 and a second bracket 16 are located on the inner surface 12. The first bracket 15 and the second bracket 16 are located at opposite ends of the opening 11, and the first bracket 15, the second bracket 16 and the opening 11 are arranged in a first line. The first bracket 15 defines a first shaft hole 151, and the second bracket 16 defines a second shaft hole 161. Each of shaft holes 151, 161 is in an ellipse-shaped. A long axis of each of the shaft holes 151, 161 is parallel with the first line.

A first location structure 17 and a second location structure 18 protrude from the inner surface 12. The first location structure 17 is adjacent to the first bracket 15 and away from the opening 11, the second location structure 18 is adjacent to the second bracket 16 and away from the opening 11. In the embodiment, the first location structure 17 and the second location structure 18 are the same. Each of the first and the second location structures 17 and 18 has two parallel plate boards 171, each of the plate boards 171 defines a through hole 1711.

Figure 4:
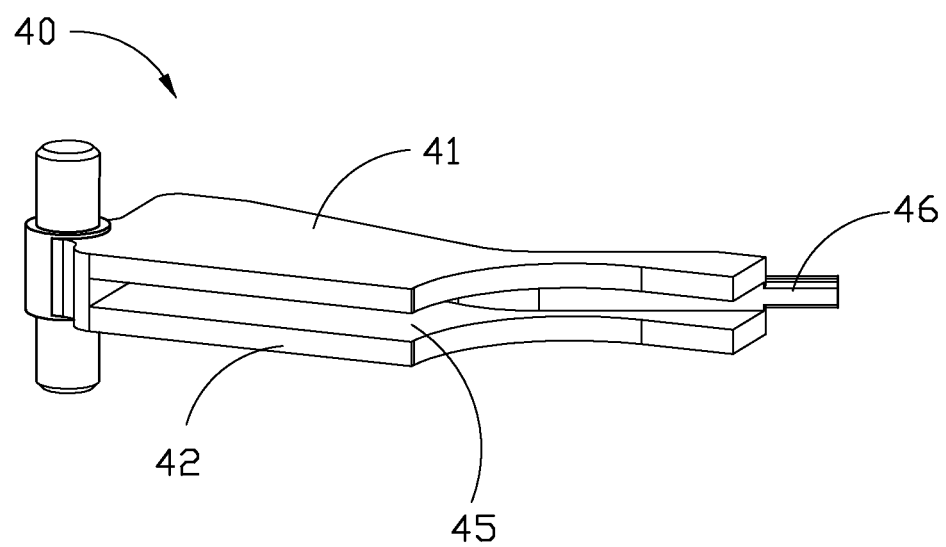
FIG. 4 is an isometric view of the first door of FIG. 2.

FIG. 4 illustrates that the first door 40 includes a first baffle 41, a second baffle 42, a third baffle 43, a fourth baffle 44, a first elastic member 70 (shown in FIG. 2 or FIG. 3), and a shaft 90a. The first baffle 41 is parallel with and spaced from the second baffle 42. The third baffle 43 and the fourth baffle 44 are connected between edges of the first baffle 41 and the second baffle 42. A first end of the third baffle 43 is connected with an end of the fourth baffle 44. In the embodiment, the third baffle 43 is substantially perpendicular to the fourth baffle 44. The first baffle 41, the second baffle 42, the third baffle 43 and the fourth cooperatively form a first guiding groove 45. The shaft 90a is located on a lateral surface of the fourth baffle 44 and away from the third baffle 43.

Figure 6:
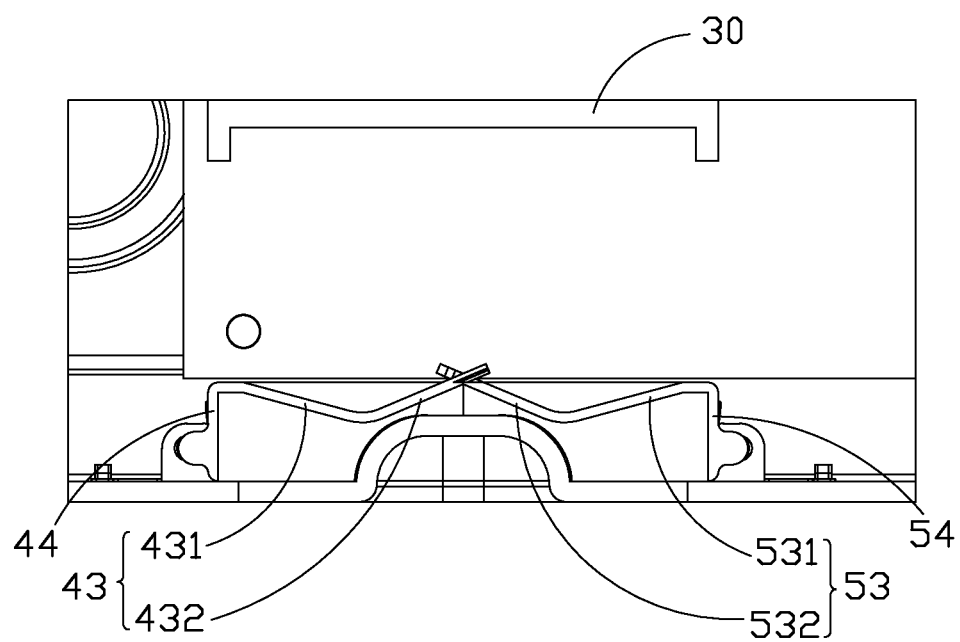
FIG. 6 shows a first state of the electronic device of FIG. 1.

FIG. 6 illustrates that the third baffle 43 of the first door 40 is V-shaped. The third baffle 43 includes a first plate 431 and a second plate 432. The first plate 431 is connected with the second plate 432, and the first plate 431 defines an angle with the second plate 432 to form a bent portion 433 protruding towards the opening 11 when the first door 40 closes the opening 11. The first plate 431 is located between the fourth baffle 44 and the second plate 432. A first protrusion 46 protrudes in an extending direction of the second plate 432 of the first door 40. In the embodiment, the first protrusion 46 is a pole or pillar-like mechanism.

FIG. 3 illustrates that the first elastic member 70 is a torsion spring. The first elastic member 70 includes a first section 71 and a second section 72 formed integrally with each other. An elastic hole 73 is defined where the first section 71 connects to the second section 72. The shaft 90a passes through the elastic hole 73, positioning the elastic member 70 on the first door 40.

FIG. 5 illustrates a structure of the second door 50. The structure of the second door 50 is substantially same as the structure of the first door 40. The second door 50 also includes a first baffle 51, a second baffle 52, a third baffle 53, a fourth baffle 54, a second elastic member 80 (shown in FIG. 2 or FIG. 3), and a shaft 90b. The first baffle 51, the second baffle 52, the third baffle 53 and the fourth baffle 54 cooperatively form a second guiding groove 55. FIG. 6 illustrates that the third baffle 53 includes a first plate 531 and a second plate 532. The first plate 531 is connected with the second plate 532, and the first plate 531 defines an angle with the second plate 532 to form a bent portion 533 protruding towards the opening 11. FIG. 3 illustrates that the second elastic member 80 includes a first section 81 and a second section 82, an elastic hole 83 is defined where the first section 81 connects the second section 82, the shaft 90b passes through the elastic hole 83 to position the elastic member 80 on the second door 50. A second protrusion 56 protrudes in an extending direction of the second plate 532 of the second door 50. The difference between the first door 40 and the second door 50 is that a gap 561 is defined in the second protrusion 56 for engaging with the first protrusion 46.

FIG. 2 illustrates when in assembly, the shaft 90a is passed through the shaft hole 151 and elastic hole 73 positioning the first elastic member 70 and rotatably fixing the first door 40 to housing 10. The first section 71 is received in the through hole 1711, and the second section 72 is stopped against the lateral surface of the fourth plate 44. Therefore, when the first door 40 is rotated to open the opening 11, the first elastic member 70 is compressed to generate an elastic force to drive the first door 40 to rotate to close the opening 11. An installation of the second door 50 is the same as the installation of the first door 40 described above. When the first door 40 and the second door 50 close the opening 11, the second plate 432 of first door 40 makes contact with the second plate 532 of the second door 50, the first protrusion 46 passes through the gap 561, and edges of the first baffle 41, 51, second baffle 42, 52 and the third baffle 43, 53 abut against the housing 10, which prevents dust or ash from contaminating the housing 10 to shorten the lifetime of the electronic members.

Figure 7:
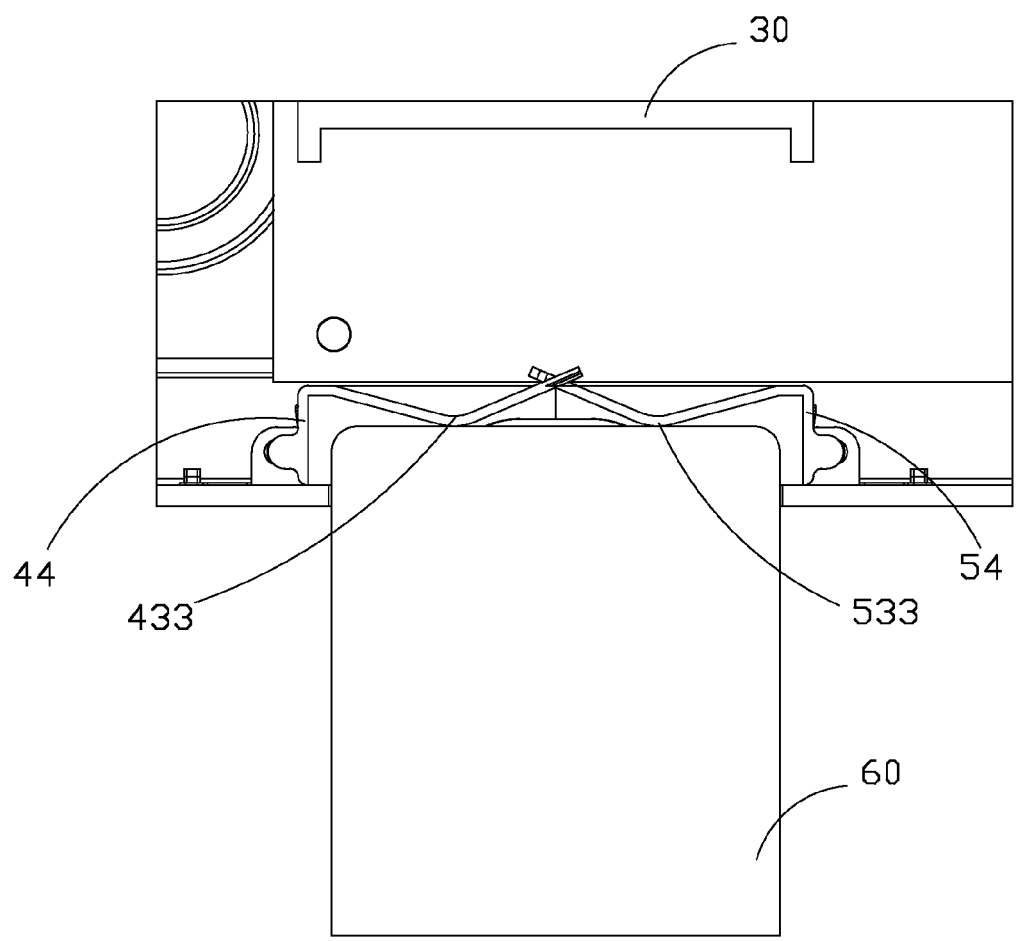
FIG. 7 is shows a second state of the electronic device of FIG. 1.
Figure 8:
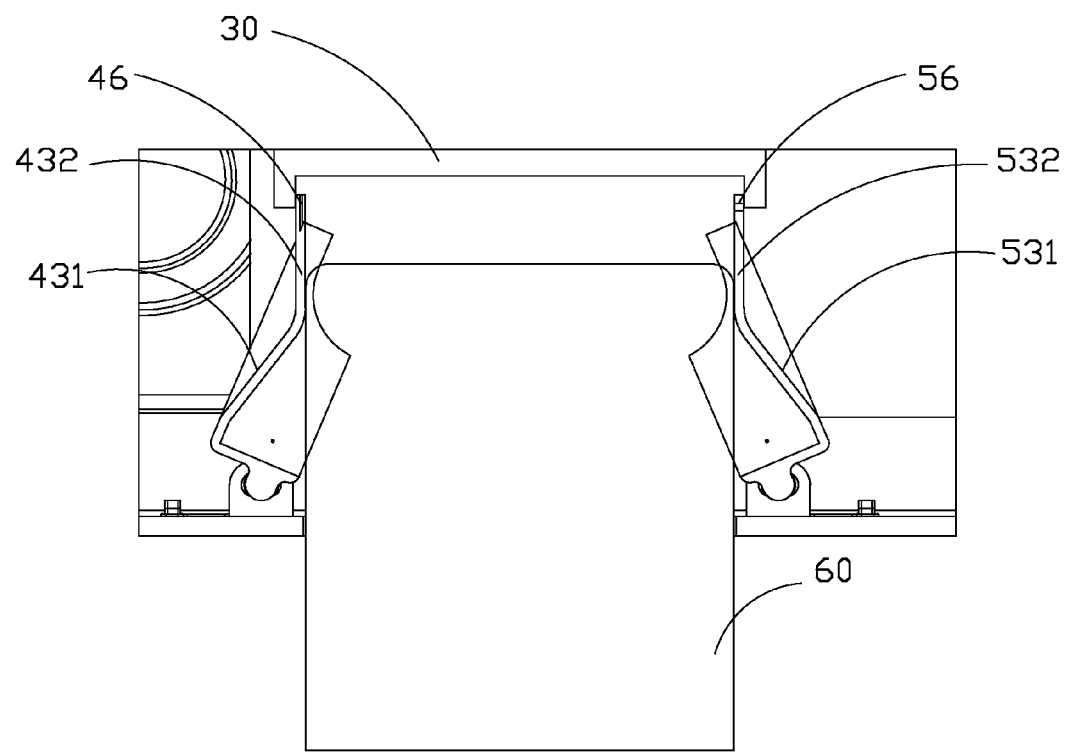
FIG. 8 is shows a third state of the electronic device of FIG. 1.

FIGS. 7 and 8 illustrate that when the memory card 60 is to be inserted into the housing 10 through the opening 11, the first door 40 and the second door 50 is forced to rotate in opposite directions to open the opening 11, the first protrusion 46 and the second protrusion 56 stop at the signal connector 30, the first elastic member 70 and the second elastic member 80 are compressed, and the memory card 60 is located between the doors 40, 50. Because the long axes of the shaft holes 151, 161 are parallel with the first line, when the memory card 60 makes contact with the first door 40 and the second door 50, the memory card 60 can force the first door 40 and the second door 50 to move along the first line moving the memory card 60 in the opening 11 along the first line. In this state, the first guiding groove 45 and the second guiding groove 55 communicate with the opening 11 and the signal connector 30, and the memory card 60 is received and supported in the first guiding groove 45 and the second guiding groove 55. The memory card 60 slides along the first guiding groove 45 and the second guiding groove 55 and is inserted into the signal connector 30 accurately with a guiding of the first guiding groove 45 and the second guiding groove 55. When the memory card 60 is removed from the housing 10, the elastic force drives the first door 40 and the second door 50 to rotate to close the opening 11.

In the embodiment, when the memory card 60 is inserted into the housing 10, the first door 40 and the second door 50 are forced to rotate to open the opening 11, the memory card 60 is received in and supported in the first guiding groove 45 and the second guiding groove 55, which allows the memory card 60 to be inserted into the signal connector 30 accurately; when the memory card 60 is removed from the housing 10, the elastic force drives the first door 40 and the second door 50 to automatically rotate closing the opening 11, which prevents contaminants from getting into the housing 10 and affecting the performance of the electronic device 100.

Many details are often found in the art such as the other features of a shielding plate. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device, comprising:
   a housing defining an opening;
   a pair of doors elastically and rotatably fixed on the housing and located inside of the housing, the doors shielding the opening; and
   a memory card inserted into the housing from the opening, the memory card forcing the doors to open, when the memory card is removed from the housing, the doors shielding the opening again;
   wherein each of the doors defines a guiding groove and when the memory card resists the doors the memory card is received in the guiding grooves of the doors.

2. The electronic device of claim 1, wherein when the memory card is inserted into the housing, the doors are rotated toward opposite directions.

3. The electronic device of claim 1, wherein the doors are located in opposite sides of the opening.

4. The electronic device of claim 1, wherein when the memory card is inserted into the housing, the memory card is located between the doors.

5. The electronic device of claim 4, wherein when the memory card is inserted into the housing, the memory card resists the doors.

6. The electronic device of claim 1, wherein each of the doors comprises a first baffle, a second baffle parallel with the first baffle, a third baffle, and a fourth baffle coupled with the third baffle, the third baffle and the fourth baffle coupled between the first baffle and the second baffle; the first baffle, the second baffle, the third baffle, and the fourth baffle cooperatively form the guiding groove.

7. The electronic device of claim 6, wherein the third baffle comprises a first plate and the second plate, the first plate is coupled between the second plate and the fourth baffle, the first plate defines an angle with the second plate and protrudes toward the opening when the corresponding door closes the opening.

8. The electronic device of claim 6, wherein a first protrusion protrudes from one of the third baffles of the doors, a second protrusion protrudes from the other one of the third baffles of the doors, when the doors close the opening, the first protrusion is inserted into the second protrusion.

9. The electronic device of claim 6, wherein a gap is defined in the second protrusion, and when the doors close the opening, the first protrusion is inserted into the gap.

10. The electronic device of claim 1, wherein each of the doors comprises an elastic member and a shaft, the shaft is rotatably connected the door to the housing, and the elastic member is located between the door and the housing.

11. The electronic device of claim 10, wherein the elastic member is sleeved on the shaft, and opposite ends of the elastic member resist the corresponding door and the housing.

12. An electronic device for loading a memory card, comprising:
 a housing defining an opening; and
 a pair of doors elastically and rotatably fixed on the housing and located inside of the housing and closing the opening, the doors being forced to open by the memory card when the memory card being inserted into the housing, and the doors being closed again when the memory card is removed from the housing;
 wherein each of the two doors defines a guiding groove and when the doors rotate toward opposite directions the two guiding grooves correspond to each other.

13. The electronic device of claim 12, wherein when the memory card is inserted into the housing, the doors are rotated toward opposite direction.

14. The electronic device of claim 12, wherein the doors are located in two opposite sides of the opening.

15. The electronic device of claim 12, wherein each of the doors comprises a first baffle, a second baffle parallel with the first baffle, a third baffle, and a fourth baffle coupled with the third baffle, the third baffle and the fourth baffle coupled between the first baffle and the second baffle; the first baffle, the second baffle, the third baffle, and the fourth baffle cooperatively form the guiding groove.

16. The electronic device of claim 15, wherein the third baffle comprises a first plate and the second plate, the first plate is coupled between the second plate and the fourth baffle, the first plate defines an angle with the second plate and protrudes toward the opening when the corresponding door closes the opening.

17. The electronic device of claim 15, wherein a first protrusion protrudes from one of the third baffles of the doors, a second protrusion protrudes from the other one of the third baffles of the doors, when the doors close the opening, the first protrusion is inserted into the second protrusion.

18. The electronic device of claim 12, wherein each door comprises an elastic member and a shaft, the shaft is rotatably connected the door to the housing, and the elastic member is located between the door and the housing.

\* \* \* \* \*